ELECTRON BEAM RECORDER

Filed Nov. 9, 1967

INVENTOR.
KARL H. LOEFFLER

BY Gerald L. Moore
ATTORNEY

United States Patent Office 3,454,821
Patented July 8, 1969

3,454,821

ELECTRON BEAM RECORDER

Karl H. Loeffler, San Jose, Calif., assignor to International Business Machines Corporation, Armonk, N.Y., a corporation of New York Filed Nov. 9, 1967, Ser. No. 681,633
Int. Cl. H01j 29/70
U.S. Cl. 315—18 5 Claims

ABSTRACT OF THE DISCLOSURE

An electron beam recorder wherein a beam is passed through a column, shaped to the desired form to indicate information and imaged onto a target for recording the information thereon. The invention deals with the specific manner in which the beam is shaped for recording the information.

BACKGROUND OF THE INVENTION

*Field of the invention*

This invention relates to electron beam recorders, and more specifically to those recorders used to write forms on targets indicative of information to be recorded.

*Description of the prior art*

In the usual case where electron beams are used to write information on a target, the beam is scanned across the target along preset scan lines and is blanked at selected locations so that after several scan lines are accomplished, a figure has been formed either where the beam is blanked or where the beam strikes the target. Also, digital data has been recorded by scanning a beam across a memory element or target and deflecting the beam in a direction normal to the beam scan direction to paint or otherwise form exposed and unexposed areas in a predetermined sequence representative of one's and zero's. In each of these instances, a single beam is utilized to write a single image point or a portion thereof at one time in a manner suggestive of painting.

Because the beam is focused to a very small point and is used to write only portions of the image at one time, the writing methods utilized in the past have been relatively slow. Attempts made to speed up the writing process generally have involved an increasing of the scan speed of the beam or the simultaneous use of several separate beams. With the use of greater scan speeds, there is less energy available for exposing the target. Additionally, the higher deflection speed usually results in a lower deflection accuracy. This is due partly to the need to dissipate more power in the deflection system during a time period. Thus, the previous attempts to speed up the writing process have introduced new problems.

A primary object of this invention is to speed up by one or two orders of magnitude the process in which an electron beam is used to write data on a target without requiring accordingly higher cathode performance, deflection-system speed, or data channel speed.

A further object of this invention is to provide an electron beam recorder utilizing a single coherent beam for forming simultaneously various independently controllable image elements on a target.

The foregoing and other objects, features and advantages of the invention will be apparent from the following more particular description of a preferred embodiment of the invention, as illustrated in the accompanying drawings.

DESCRIPTION OF A PREFERRED EMBODIMENT OF THE INVENTION

Figure 1:
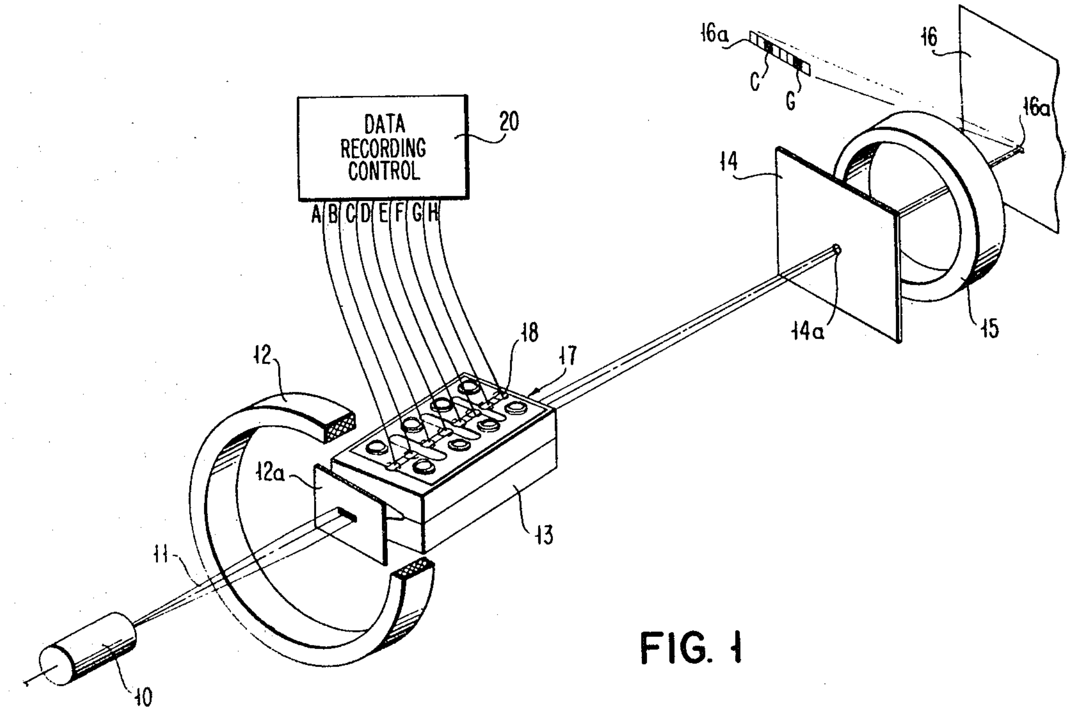
FIGURE 1 is a prospective view of an electron beam recorder incorporating the subject invention.

In FIGURE 1 is shown an electron beam recorder comprising an electron beam source 10 adapted to emit a beam of electrons 11. This electron beam is passed through a condenser lens 12, an aperture forming plate 12*a* fitting to a transducer assembly 13, and an aperture forming plate 14 in the vicinity of a focusing lens 15. Subsequently, the beam strikes a target taking the form of a memory element 16 of a suitable type of material for recording the area struck by the beam. Thus, the target could be the face of a CRT, a photoresist covered object, or, as shown in this embodiment, a light sensitive film such as the silver halide type which, when exposed to an electron beam, forms a photographic impression of the trace. In FIGURE 1, the target is shown in an enlarged form for purposes of illustrating the invention.

Figure 2:
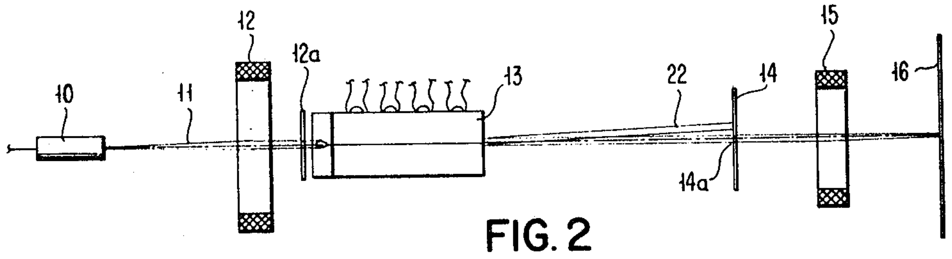
FIGURE 2 is a side elevation view of the recorder of FIGURE 1.
Figure 3:
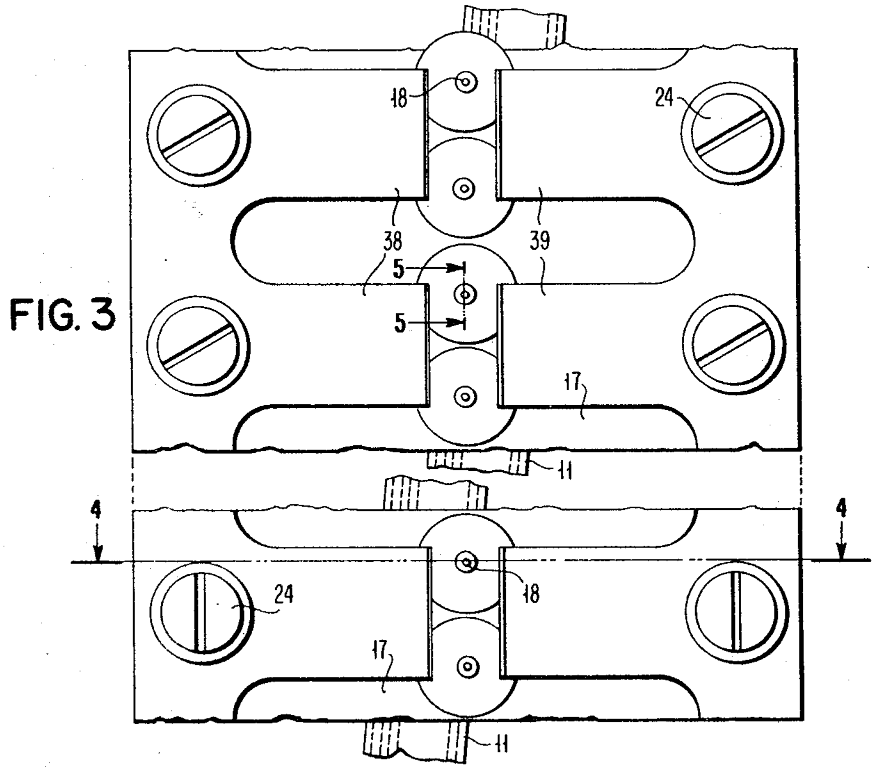
FIGURE 3 is an enlarged view of the shaping aperture shown in the preceding figures.
Figure 4:
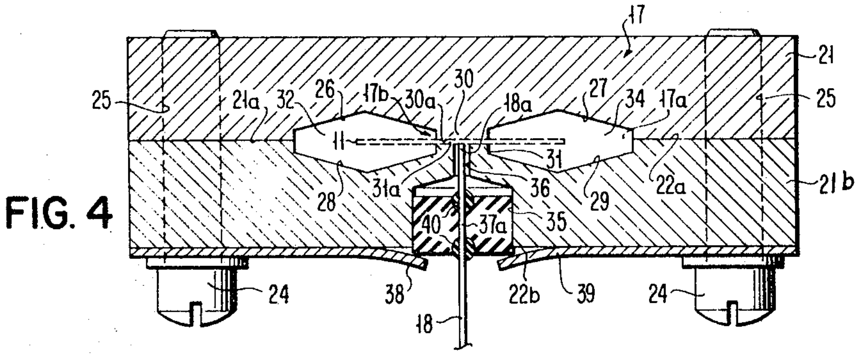
FIGURE 4 is a cross-sectional view of the aperture of FIGURE 3 taken along the lines 4—4.

In accordance with the present invention, the aperture assembly 13 includes a transducer body 17 forming a first aperture or opening 17*a* having means for altering electrically the shape of the electron beam, with such means taking the form of electrically energizable members positioned in the periphery of the aperture for deflecting selected portions of the beam in accordance with the data to be recorded on the memory element. In one example shown, there is extended into the wall of the transducer body 17 (FIGS. 3 and 4) a series of conductors 18, each individually insulated from the other and from the transducer body. Each conductor is connected directly to a data recording conttrol 20 (FIG. 1). The data recording control includes switching means for selectively impressing on the individual conductors a voltage potential sufficient to establish an electric field extending across the opening 17*a*. Thus, as shown in FIGURE 1, with selected ones of the conductors, for instance, with the conductors lettered A through H, those connected with conductors C and G energized to a sufficient voltage, portions 22 (FIGURE 2) of the beam are deflected away from the normal path and strike the aperture forming plate 14. Such beam portions, in striking the aperture forming plate 14 instead of passing through the second aperture 14*a* formed therein, will be prevented from striking the target 16. Thus, as shown, the flood beam passing through the aperture 12*a* and the transducer assembly 13 will be blanked at the sections C and G and prevented from striking the target.

The aperture assembly 13 comprises a pair of plates 21 and 21*b* (FIGS. 3 and 4) clamped together by a plurality of bolts 24 extending through aligned openings 25 therein. Formed in the abutting faces 21*a* and 22*a* of these plates are pairs of parallel, V-bottomed grooves 26, 27, 28, and 29 separated by lands 30 and 31. When the plates are clamped together, the opposing grooves 26, 28 and 27, 29 form elongated cavities 32 and 34, respectively. These cavities are connected by a narrow passage 17*b* bounded by the opposing faces 30*a* and 31*a* of the lands which together form the opening 17*a* for the beam. Thus an electron beam having an elongated recangular cross-section is permitted to pass through the perture 12*a*.

Extending into the outer face 22*b* of the plate 21*b* is series of round openings 35 connecting with a hole 36 f much smaller diameter leading through the land 31. Clamped into each opening 36 is an insulator 37 having a ole 37*a* extending therethrough along the axis of the iole 35. The insulator is clamped by a pair of flat spring nembers 38 and 39 held by the bolts 24. Cemented at ioints 40 in each hole 37*a* is one of the conductors 18 uch that it extends through the smaller opening 36 to a osition such that the end 18*a* of the conductor is posiioned in the plane of the face 31*a* of the land.

As explained before, by energizing each of these conuctors 18 individually and selectively, an electric field is ormed extending across the passage 17*b* at a point nmediately adjacent the end 18*a* of the conductor. The oltage impressed on the conductor is of a magnitude o create the electric field of sufficient strength to deect the adjacent portion of the beam passing through he opening 17*a*. By causing selected portions of the eam to be directed along a path out of alignment with he downbeam positioned aperture 14*a*, as shown in IGURE 2, selected portions of the beam are masked n accordance with an incoming data signal supplied by he control 20. Thus, there are projected simultaneously everal bits of data on the target with each bit being ndividually controllable. Naturally, the aperture 12*a* nd the opening 17*a* can take many shapes with the inention functioning to blank selected portions therefrom. ilso, not shown, is means for heating the beam exposed omponents to limit contamination buildup thereon. ince the transducer assembly should be maintained at a emperature of approximately 300° C., it is necessary to onstruct the assembly of materials which will withstand ne higher temperatures.

To illustrate the manner in which data is written, there s shown in FIGURE 1 the shape of the electron beam s it strikes the memory element 16. This beam shape is n image of the passage 17*b* which, in the illustration, onsists of eight separate conductors 18 identified by ne letters A through H. Each two sections thereof repreents an exposure element which, for example, can be one ata bit, such that a transition from exposed to unexosed within the center of one of the data bits imaged on ne memory element indicates a Zero with the areas vhere both sections are struck with the beam indicating One. As shown in the enlarged illustration 16*a*, four ata bits can be written. With the sections C and G, lanked, the data bit sequence reading from right to left One, Zero, One, Zero. Of course, any combination f Ones and Zeros can be written by this system with the umber of bits exposed at any one time being limited only the mechanical configuration of the electron beam olumn. That is, the size of the opening 17*a* and the beam ower are the primary factors governing the length of ne line which can be written simultaneously on the taret. While not shown, the memory element is indexed pwards or downwards to the position for the writing of ne next line of information. In the alternative, a certain can could be obtained by the proper energization of the oil 15 to deflect the beam over a field of several lines efore translation of the memory element is necessary. dditionally, the conductors 18 can be energized to a oltage to deflect only a part of the adjacent portion of ne beam thereby to image a gray area on the target inead of a black or white area corresponding to comletely exposed or unexposed sections. Also images other nan digital data can be formed on the target by the roper energization of the aperture assembly 13 while the eam is being deflected across the target.

Another feature of the invention involves positioning ne aperture assembly 13 at an angle other than normal the axis of the beam for a more precise control of the eam shape. Since the depth of focus of the beam is not critical because the beam deflective angles are small, the focusing of the beam on the target is not adversely affected by such positioning. However, by so positioning the aperture forming assembly such that an axis formed by a line passing through the conductors 18 is at an acute angle with the beam axis, the conductors are imaged close together on the target and appear to be positioned immediately adjacent one another within the aperture assembly when, in fact, they are separated. Thus, the manufacture of the aperture assembly is simplified. An alternative approach would be to utilize several side by side rows of conductors 18 positioned on an angle other than 90° to the beam axis.

Figure 5:
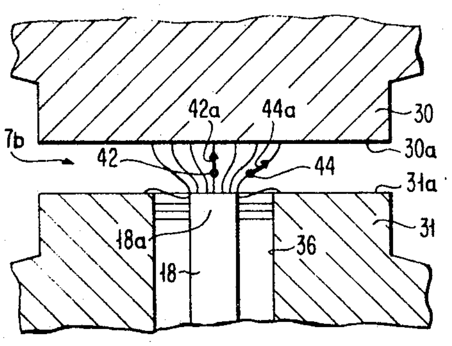
FIGURE 5 is an enlarged cross-sectional view along the lines 5—5 of FIGURE 3.

In accordance with another feature of the invention, the cross-section of the beam portion passing within the influence of the electric field created by the energization of the conductor 18 and extending across the passage 17*b* is formed such that a sharply limited and almost rectangular beam portion will be blanked when the conductor is energized, even though it is difficult, if not impossible, to create a uniform electric field for influencing the beam. To illustrate the problem, FIGURE 5 shows the passage 17*b* with the electric field resulting when the conductor 18 is energized being represented by the lines 41. As shown, the electric field is not uniform. In operation, the beam segment represented by the dot 42 will be deflected in a direction and at a force indicated by the arrow 42*a*. This will cause the segment to be intercepted by the downbeam positioned plate 14 as desired.

Figures 6A, 6B:
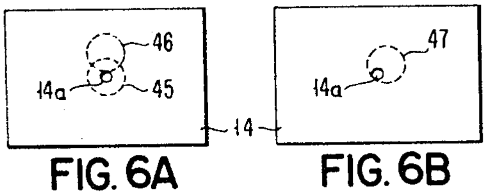
FIGURES 6A, 6B, 7A and 7B show the enlarged aperture plate with the beam imaged thereon in various positions.

However, the segment 44 illustrated in being deflected along the electric field lines will be reacted by a force and in a direction represented by the arrow 44*a*. Because of the partially non-symmetrical configuration of the electric field, the upward force and deflection of the beam segment is reduced and a lateral deflection is added. However, it is desirable that only the upward deflection be effective in blanking the beam portion. In FIGURES 6A and 6B the image of a segment as it strikes the plate 14 is shown. The dotted outline 45 shows an image of an undeflected beam segment. In the same figure, the circle 46 represents the image of the segment 42 as it strikes the plate 14 after being deflected by energization of the conductor 18. Note that the image does not overlap the aperture 14*a* and thus is blanked from striking the target, as desired.

The problem of partial beam blanking is illustrated in FIGURE 6B. Herein the image 47 represents the segment 44*a* as it strikes the plate A. Note that the segment is shifted both upward and to the right but, because the vector force 44*a* is not totally upward, the image overlaps the aperture 14*a*. Thus, a portion of the beam is permitted to strike the target and there results a partially exposed image where no beam exposure is desired.

Figures 7A, 7B:
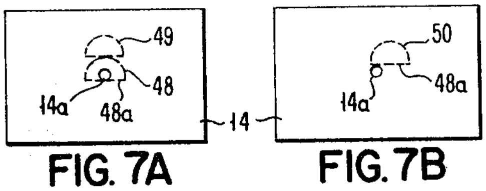

In accordance with this feature of the invention, the beam is formed with an image 48 (FIGURE 7A) as it strikes the plate 14 to prevent extensive image areas of partial beam blanking. That is, the side 48*a* of the beam segment located away from the direction the beam is deflected for blanking is squared off by forming the beam as a semi-infinite plane rather than a circle. Such a forming of the beam can be accomplished, for instance, by the proper shaping of the aperture in the plate 12*a*. Now, as illustrated by the image 49, when the beam segment is deflected, the edge 48*a* is shifted beyond the aperture 14*a* for beam blanking. In addition, FIGURE 7B shows by the image 50 that, even that segment 44 (FIGURE 5), in being shifted both upwardly and laterally also is blanked, since the flat side 48*a* again does not overlap the aperture 14*a*. Thus, a more complete blanking of the beam is achieved even though the electric field is nonuniform since only the lateral shifting of the beam is effective for blanking purposes. Any lateral shifting only of the beam segment will not blank the beam because the semi-infinite plane configured image still will overlap the aperture 14*a*.

Figure 8:
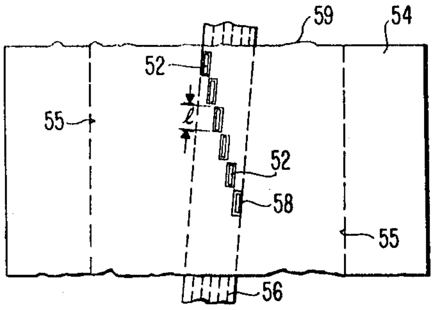
FIGURE 8 shows a second embodiment of the invention.

In FIGURE 8 is shown another feature of the invention for forming a sharply limited and almost rectangularly shaped beam portion which can be blanked effectively. In addition to the forming of the beam so that even the portions passing through the fringes of the aperture electric field are blanked, as described in the previous feature, another factor enhancing the capability of blanking nearly rectangular beam portions is the length of the electric field measured along the beam axis to which the beam is exposed.

Accordingly, conductors 52 (FIG. 8) are held in an aperture assembly 54 having formed therethrough an aperture outlined by the dotted lines 55. The beam 56 is passed therethrough at an angle, as in the embodiment shown in FIG. 3. To blank portions of the beam, conductors 52, held in insulators 58 in the wall 59 forming the aperture, are energized to a voltage potential sufficient to deflect the portion of the beam passing adjacent thereto. By forming the conductors to extend a distance along the beam axis, the beam is forced to pass through the elongated electric field and more precise deflection is achieved for effective blanking of the beam portions.

While the invention has been particularly shown and described with reference to a preferred embodiment thereof, it will be understood by those skilled in the art that various changes and modifications may be made without departing from the spirit and scope of the invention.

I claim as my invention:

1. An electron beam device for writing data on a target comprising a source of electrons forming a beam;

means to direct said electron beam onto said target;

a member forming a first aperture through which the beam is passed before reaching the target, individually controllable means comprising separately energizable field forming elements which function when charged to a voltage potential to deflect selected portions of the beam passing through said aperture thereby to cause said selected portions to be imaged at a point remote to the normal position of impact on the target with the undeflected portion and deflected portions of the beam being selected to represent data to be imaged, and a second aperture forming member positioned between the first aperture member and the target forming a second aperture through which the portions of the beam will pass when the field forming element adjacent thereto is not energized.

2. An electron beam device as defined in claim 1 wherein at least a portion of said field forming elements are positioned at an angle other than normal to the beam axis.

3. An electron beam device as defined in claim 1 wherein said field forming elements comprise a series of insulated conductors extending toward said aperture and held within the aperture forming member, in combination with means for selectively impressing a voltage potential on each conductor.

4. An electron beam device as defined in claim 3 wherein said conductors are formed with an elongated portion extending along the beam axis so as to expose the beam to a longer electric field.

5. An electron beam device as defined in claim 1 wherein the beam is formed with the side opposite the direction of deflection being squared off so that such deflection will prevent the beam from striking the normal position of impact.

References Cited

UNITED STATES PATENTS

| | | | |
|---|---|---|---|
| 2,761,988 | 9/1956 | McNaney | 340—324.1 |
| 2,875,370 | 2/1959 | Young et al. | 340—324.1 |
| 2,964,672 | 12/1960 | Nixon | 340—324.1 |
| 3,082,341 | 3/1963 | Balaskovic | 340—324.1 |
| 3,331,985 | 7/1967 | Hamann | 340—324.1 |

RODNEY D. BENNETT, Jr., *Primary Examiner.*

BRIAN L. RIBANDO, *Assistant Examiner.*